DAVID SLAUGHTER, OF WEST HEMPFIELD TOWNSHIP, PENNSYLVANIA.

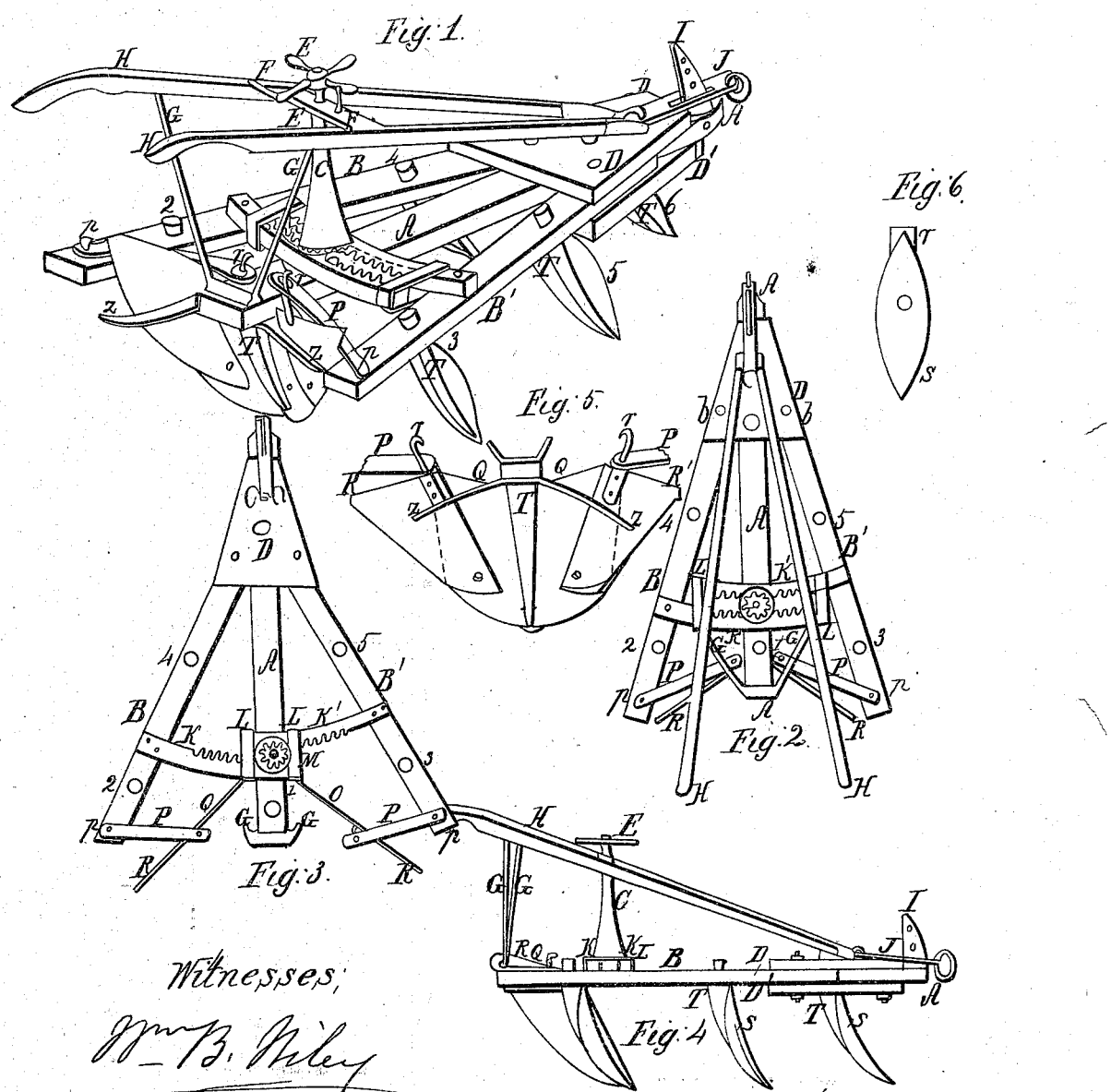

Letters Patent No. 87,373, dated March 2, 1869.

IMPROVEMENT IN CULTIVATORS.

The Schedule referred to in these Letters Patent and making part of the same.

*To all whom it may concern:*

Be it known that I, DAVID SLAUGHTER, of West Hempfield township, in the county of Lancaster, and State of Pennsylvania, have invented new and useful Improvements on Cultivators; and I do hereby declare that the following is a full description of the construction and operation of the same, reference being had to the accompanying drawings, making a part of this specification, in which—

Figure 1 is a perspective view of the improvements in place.

Figure 2, a top view, showing the side beams closed.

Figure 3, the same, with the side wings drawn out.

Figure 4, a side view or elevation.

Figure 5, the central shovel, with its wings and appliances.

Figure 6, one of the five ordinary shovels.

The nature of my invention consists in providing a means to expand and contract the side arms of the cultivator and the rear central shovel simultaneously, by means of a turning-shaft, for the purpose of regulating its operation to the width between the rows, whether regular or irregular, and, while in motion, to adjust without stopping.

To enable others skilled in the art to make and use my invention, I will more fully describe the several parts.

There is a central beam, A, and two side or wing-beams, B B', as shown, in numerous cultivators.

The side beams are, however, supported between two triangular plates, or pieces, D D', the base extending on each side of the central beam, so as to form an open box or bearing for the side beams, in which they turn on a pivot-bolt in front.

The handles H are fastened to the top of the upper triangular plate D, and braced together by a cross-plate, E, which also forms the upper bearing for a vertical turn-shaft, C, with radiating arms, which shaft has its step or lower bearing in the central beam, A, being also provided with a pinion, which meshes into a pair of curved and cogged racks, K K', on opposite sides.

The outer end of each rack is secured to its respective beam, B B', there being a loop, L, on the inner end of each, so that the other rack slides freely in said loop of its counterpart, as shown, with the pinion on the vertical shaft C between them, a turn of which will throw the beams apart, or draw them inward.

On the rear of each wing B B' is a strap, P, connected to the wing R, affixed, by a pivot below, to the central shovel No. 1, or Q, which is secured to the central beam, behind the rack.

These wings are so constructed as to widen or contract the scraping-surface of the central shovel, in proportion as the beams are spread apart or contracted.

The radiating arms, being convenient to the hands while holding the handles, are easily operated, and, by affixing any ordinary spring-catch, the arms can be temporarily locked to hold the adjusted beams in place for the time being, and readily unlock, to change the same, as the nature of the case demands.

I am aware that hinged side-beams are common, and made adjustable by various combinations; but I am not aware of any arrangement for that purpose, substantially made or operated, as is fully shown, and herein set forth, Fig. 5 illustrates the central shovel Q Q, with a central supporting-brace, R R'.

The side-wings are provided with an ear, and hooked projection, r, entering through an enlarged opening in the connecting-band P, which latter is fastened by a pin, p, to the end of the beams B B', on each side respectively.

There is also a guide or stay-brace, Z, shown fastened on the lower side of the beam A, from the top of which also rise the handle-supports G G.

This description, in connection with the drawings, will suffice to convey a correct idea of the construction and operation of my improvement.

What I claim as my invention, and desire to secure by Letters Patent, is—

The construction of the central shovel or scraper Q with its side wings R R', hook-ends r, in combination with the connecting-straps P, the side beams B B', together with the wing-stay or guide Z, arranged and operating substantially in the manner and for the purpose set forth.

DAVID SLAUGHTER.

Witnesses:
WM. B. WILEY,
JACOB STAUFFER.